Patented July 30, 1935

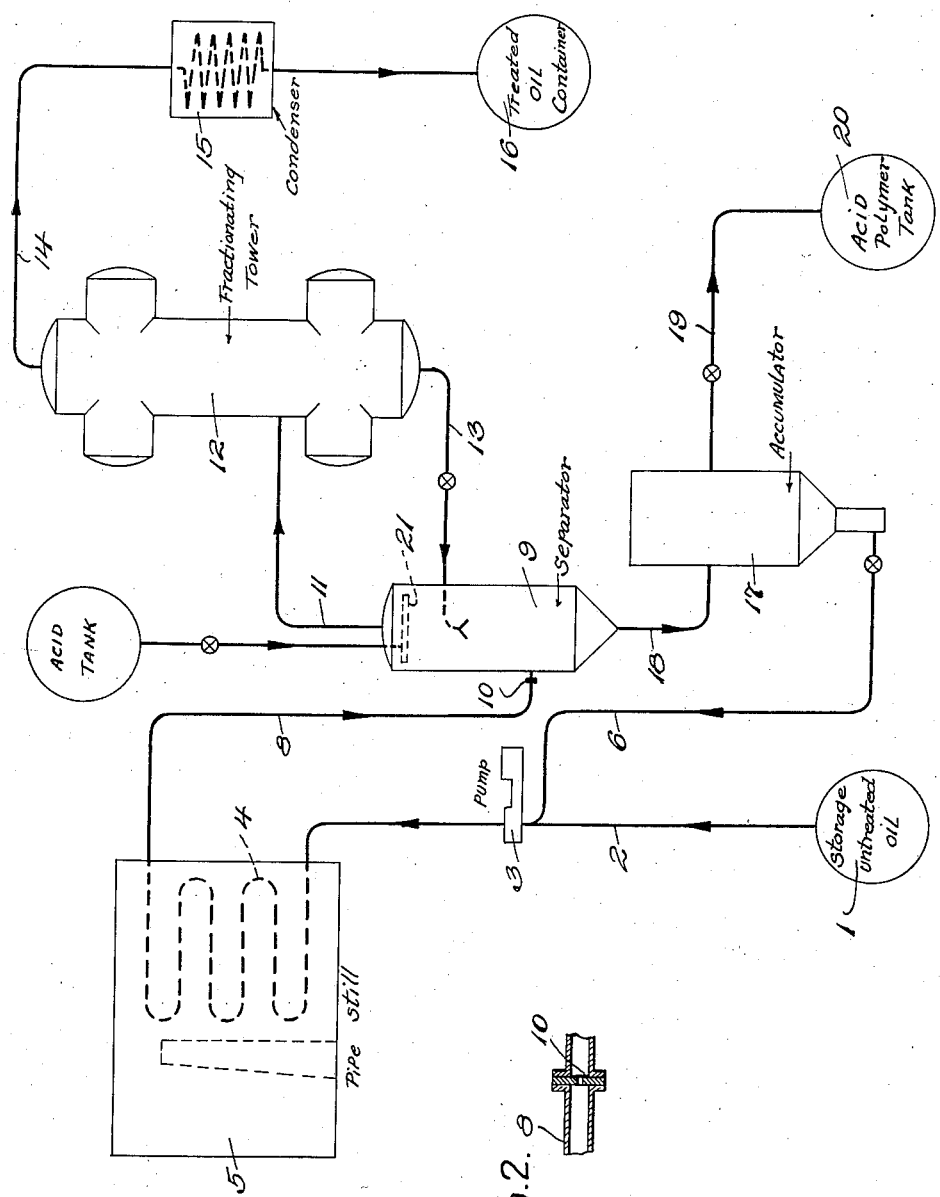

2,009,902

UNITED STATES PATENT OFFICE 2,009,902

METHOD OF POLYMERIZING HYDROCARBON OILS

Rudolph C. Osterstrom, Chicago, Ill., assignor to The Pure Oil Company, Chicago, Ill., a corporation of Ohio Application November 9, 1929, Serial No. 406,051
Renewed November 2, 1934

2 Claims. (Cl. 196—35)

This invention relates to the art of removing through polymerization gum-forming and color-imparting bodies from cracked petroleum distillates. Petroleum distillates obtained from high temperature or vapor phase cracking systems, and to a lesser degree in liquid phase cracking systems, contain unsaturated compounds in the form of undesirable diolefines which, if permitted to remain in the distillate, promote the formation of gum compounds which are highly undesirable in motor fuels particularly. It is, therefore, an object of the present invention to provide a continuous and effective method for treating such distillates whereby the undesirable compounds are subjected to rapid polymerization reactions in order to produce in the distillates under treatment the formation of high boiling polymers which comprise the undesirable compounds in order that by subsequent fractionation, and without additional heat treatment, said polymers may be removed completely and effectively from the desired lighter low boiling fractions, permitting the latter to be separately collected and stored as a finished motor fuel product and free, upon analysis, from color-imparting and gum-forming compounds.

In earlier systems proposed for this polymerization and purification of cracked petroleum distillates it has been customary to effect the polymerization reactions by vaporizing the untreated distillates and then bringing the latter while in a vaporized form into intimate contact with fuller's earth which functions as a catalyst or an adsorbent in promoting the polymerization of the undesired compounds. This method has been objectionable for the reason that the fuller's earth rapidly loses its catalytic activity after relatively short periods of use and requires further revivification treatment to restore its activity as a catalyst or substitution of fresh beds of earth. Not only are the material costs relatively high from the standpoint of commercial operation, but in addition the labor costs are quite high in the matter of controlling the admission and discharge of the clay from the treating system.

It is another principal object of the present invention to provide a method of polymerization for cracked petroleum distillates which does not require the use of fuller's earth as a catalyst, but in lieu thereof employs polymerized products of the system which are subjected to cyclic circulation for repeated passage through the polymerizing zone of the system, it having been found that such polymerized products possess in themselves a high degree of catalytic activity in promoting the polymerization of the undesirable compounds present in untreated distillates, and therefore by the use of such heavy polymerized compounds I am enabled to carry out the polymerization reactions to the desired degree in an efficient and economical treating system, and one wherein the use of fuller's earth as a treating material has been omitted.

It is a further object of the invention in the treatment of certain different types of distillates to acidify the polymer fraction by introducing sulphur dioxide or sulphuric acid in regulated quantities into the separating zone of the system whereby when the acidified polymers are passed through the highly heated polymerization zone of the system, the acid released readily attacks the vaporized distillate, also passing through said polymerization zone, to promote the desired polymerization of the diolefines present in the distillate.

The present invention is thus characterized and distinguished from earlier processes by, first, the employment of polymerized fractions as a contact, catalytic or treating material in the polymerization zone; second, the employment of acidified polymers as the contact, catalytic or treating material; third, the recirculation of the catalytic or treating materials through the polymerization zone; fourth, the elimination of fuller's earth as a catalytic or treating material; and, fifth, the provision of a continuous treating system as distinguished from the intermittent or once through systems.

For a further understanding of the invention reference is to be had to the following description and the accompanying drawing wherein is disclosed diagrammatically apparatus used in carrying the present invention into practical operation.

Referring more particularly to the drawing, the numeral 1 designates a tank which is adapted for the reception of an untreated hydrocarbon distillate obtained, for example, from a cracking still. Leading from the tank is a pipe line 2 in which is located a high pressure pump 3 by the use of which the oil or distillate under treatment is forced through the elongated coil 4 of restricted cross-sectional area. This coil constitutes a polymerizing zone and is adapted to be heated by being located within the setting in order to form a part of the vaporizing still 5. Entering the inlet side of the pump 3 is a pipe line 6 through which is drawn or passed a heavy high boiling fraction of oil obtained by the operation of the system and which may be termed for convenience in description the "polymer fraction."

Within the tube still 5, or more particularly the coil 4, the distillate obtained from the tank 1 and the polymer fraction are subjected to temperatures of, for example, 650° F. to 700° F., and these combined oils within the polymerizing zone are subjected to super-atmospheric pressures of approximately 200 pounds per square inch. The lower boiling oils while passing through the zone 4 are thus permitted to vaporize, since the pressures employed are not sufficiently high to prevent such vaporization at the oil temperatures specified, and while the oil is in the vaporized state it reacts freely with the high boiling polymer fraction to effect the necessary polymerization of the undesirable compounds present in the vaporized distillate, chiefly the diolefines. As will be later explained, in the treatment of oils which are difficult to polymerize, I have found it desirable to acidify the polymers comprising the polymer fraction, by treating such fraction preferably with sulphur dioxide, although sulphuric acid, dilute sulphuric acid or the equivalent thereof may be employed if found desirable. The sulphur compounds present in the polymerizing zone by this method of operation also promote the polymerization reactions on the part of the undesirable compounds present in the distillate under treatment in order to provide for the subsequent convenient separation of the high boiling polymerized compounds from the low boiling desired oils. The acidified polymer fraction operates very effectively in the treatment of cracked petroleum distillates obtained from vapor phase systems of conversion wherein high percentages of diolefines are present and which require vigorous treatment.

From the pipe still 5 the treated vapors pass by way of a pipe line 8 to a separating chamber or vaporizer 9. The line 8 contains a restricted orifice plate 10, shown in detail in Figure 2 at the entrance to the separating chamber 9, said orifice plate serving to maintain the desired back pressure in the polymerizing zone. As the vapors enter the separating chamber they are permitted to expand freely under reduced pressure in order that there may take place an effective separation of the relatively heavy high boiling point polymerized compounds as liquids from the desired and treated low boiling point oils. The latter remains in the vapor phase and pass overhead from the separating chamber by way of a pipe line 11 to a fractionating tower 12. In this tower the vapors are subjected to a standard fractionating operation in order to remove from the vapors all entrained high boiling compounds and polymers. These high boiling compounds collect as a liquid in the bottom of the fractionating tower and may be returned to the top of the vaporizer 9 by the pipe line 13, where they are employed to scrub the vapors passing upwardly through the chamber 9. The pipe line 14 leads from the top of the fractionating tower to a condenser 15, where the desired end product is reduced to liquid form and is then lead to a storage tank 16. The end product which collects in the tank 16 constitutes the desired end product of the system, and analyses thereof have disclosed that it is substantially free from compounds which tend to produce gum in or to discolor the same. This product may be maintained stable insofar as its gum content is concerned by adding thereto a gum-forming inhibitor such as hydroquinone.

An important feature of the present invention resides in collecting the liquid polymers in the bottom of the separating chamber and then leading these polymers to a storage tank 17 by the employment of the pipe line 18. The bottom of the tank 17 connects with the pipe line 6 and is suitably valved in order to regulate the return of the polymer fraction to the inlet side of the pump 3. This flow arrangement provides for the cyclic circulation of a portion, at least, of the polymer fraction through the essential passages and treating zones of the system. However, the excess liquid polymers are withdrawn from the tank 17 by way of the pipe line 19 and are led to a storage tank 20. The top of the separating chamber 9 is provided with a coil 21 permitting of the introduction into the system of regulated quantities of sulphur dioxide, or sulphuric acid, suitably regulated in strength in accordance with the character of the distillates under treatment.

The present invention provides a simple and effective method for effecting the polymerization of the undesirable diolefines contained in cracked motor fuel distillates. The system possesses many advantages over heretofore standard methods of practice in operations of this character in that, first, it eliminates the use of an adsorbent such as fuller's earth, second, it makes use of a portion of the polymers obtained from the system as a treating agent in the polymerizing zone for promoting polymerization reactions, third, it permits the use of an acidified polymer fraction which I have found to be highly effective in the treatment of distillates wherein difficulty is encountered in completely polymerizing the gum-forming compounds therein, and finally the system described is of great advantage in the matter of reducing operating costs and also in the elimination of intermittent operation.

What is claimed is:

1. The process for removing gum-forming compounds from cracked low boiling petroleum distillates, the steps which comprise continuously passing a stream of such distillates through an externally heated polymerizing zone, introducing into the distillate prior to the passage thereof through said zone a polymerizing agent consisting of petroleum polymers treated with sulphuric acid, heating the mixture in said polymerizing zone to temperatures sufficiently high to substantially vaporize said distillates while the latter are maintained under superatmospheric pressures, removing the products from the polymerizing zone and transferring the same to a separating zone, removing from one point of said separating zone as vapors the desired low boiling treated oils, removing from another point of said separating zone high boiling polymerized oils, and contacting said high boiling polymerized oils with sulphuric acid.

2. The process for removing gum-forming compounds from cracked low boiling petroleum distillates, the steps which comprise continuously passing a stream of such distillates through an externally heated polymerizing zone, introducing into the distillate prior to the passage thereof through said zone a polymerizing agent consisting of petroleum polymers treated with sulphuric acid, heating the mixture in said polymerizing zone to temperatures sufficiently high to vaporize said distillates while the latter are maintained under superatmospheric pressures, removing the products from the polymerizing zone and transferring the same to a separating zone, removing from one point of said separating zone as vapors the desired low boiling treated oils, removing from another point of said separating zone high boiling polymerized oils, contacting said high boiling polymerized oils with sulphuric acid and returning a portion, at least, of the acid contacted polymerized oils to the distillate inlet of the polymerizing zone for repassage through said latter zone with said distillates.

RUDOLPH C. OSTERSTROM.